United States Patent [19]

Takano et al.

[11] 4,032,924

[45] June 28, 1977

[54] DISTORTION REDUCTION IN INK JET SYSTEM PRINTER

[75] Inventors: Rikuo Takano, Musashino; Yutaka Ohota, Kodaira; Yoichi Yamamoto; Yuji Sumitomo, both of Nara; Toshio Kobayashi, Osaka; Masahiko Aiba, Nara, all of Japan

[73] Assignees: Nippon Telegraph and Telephone Public Corporation; Sharp Kabushiki Kaisha, both of Osaka, Japan

[22] Filed: Oct. 30, 1975

[21] Appl. No.: 627,377

[30] Foreign Application Priority Data

Oct. 31, 1974 Japan ............................ 49-126144

[52] U.S. Cl. .................................................. 346/75

[51] Int. Cl.$^2$ ........................................ G01D 15/18

[58] Field of Search ...................................... 346/75

[56] References Cited

UNITED STATES PATENTS

| | | | |
|---|---|---|---|
| 3,562,757 | 2/1971 | Bischoff | 346/75 X |
| 3,631,511 | 12/1971 | Keur et al. | 346/75 |
| 3,789,422 | 1/1974 | Haskell et al. | 346/75 |
| 3,833,910 | 9/1974 | Chen | 346/75 X |
| 3,836,912 | 9/1974 | Ghougasian et al. | 346/75 |
| 3,852,768 | 12/1974 | Carmichael et al. | 346/75 |
| 3,911,445 | 10/1975 | Foster | 346/75 X |

*Primary Examiner*—George H. Miller, Jr.

*Attorney, Agent, or Firm*—Birch, Stewart, Kolasch & Birch

[57] ABSTRACT

In an ink jet system printer of the charge amplitude controlling type, when it is desired to charge a specific ink drop being formed, the amplitude of charge for the specific ink drops is increased in accordance with a total of field strength of electric fields due to the charge amplitude of the preceding ink drops, the charge of the thus increased amplitude being supplied to the specific ink drop to thereby alleviate any charge distortion.

2 Claims, 12 Drawing Figures

| No | RoM Output | NO | RoM Output |
|---|---|---|---|
| 1 | 1 | 26 | 0 |
| 2 | 1 | 27 | 0 |
| 3 | 1 | 28 | 1 |
| 4 | 1 | 29 | 1 |
| 5 | 1 | 30 | 0 |
| 6 | 1 | 31 | 0 |
| 7 | 1 | 32 | 0 |
| 8 | 1 | 33 | 0 |
| 9 | 0 | 34 | 0 |
| 10 | 0 | 35 | 1 |
| 11 | 1 | | |
| 12 | 0 | | |
| 13 | 0 | | |
| 14 | 1 | | |
| 15 | 1 | | |
| 16 | 0 | | |
| 17 | 0 | | |
| 18 | 1 | | |
| 19 | 0 | | |
| 20 | 0 | | |
| 21 | 1 | | |
| 22 | 1 | | |
| 23 | 0 | | |
| 24 | 0 | | |
| 25 | 1 | | |

DISTORTION REDUCTION IN INK JET SYSTEM PRINTER

BACKGROUND OF THE INVENTION

The present invention relates to an ink jet system printer provided with means for compensating for any charge distortion in ink drops.

It is well known in the art of ink jet system printer that high speed pringing performances require increase in frequency of ink drop formation. Furthermore, it is required to increase ink pressure but such requirement is not fully satisfied in view of size and weight of the printers. An alternate approach to increase the drop formation frequency is to decrease ink drop spacing. In accordance with such approach, the charging of a specific ink drop is influenced by an electric field established due to the preceding ink drops to thereby occur charge distortion and, therefore, the specific ink drop being currently charged can assume the amplitude of charge smaller than a desired one. This causes faulty printing. In the past, several approaches were suggested in order to reduce such charge distortion, as disclosed U.S. Pat. No. 3,631,511 entitled "DROP CHARGE COMPENSATED INK DROP VIDEO PRINTER" on Dec. 28, 1971 wherein the charge on an ink drop being formed is compensated upon the charge on the drop already formed, and U.S. Pat. No. 3,562,757 entitled "GUARD DROP TECHNIQUE FOR INK JET SYSTEMS" on Feb. 9, 1971 wherein guard drops are provided between the charged drops which act as a shield to minimize the adverse affects of drop charge repulsion.

However, the inventor's experiments show that in the former arrangement distortion of around 10% develops when $\lambda d \approx 4.8$ wherein $d$ is the diameter of a charging electrode and $\lambda$ is the ink drop spacing, while in the latter arrangement printing speed is decreased by one-half, accompanying distortion of around 8%.

It is, therefore, an object of the present invention to provide an improved ink jet system printer having a charge compensator.

BRIEF DESCRIPTION OF THE DRAWINGS

Other objects and many of the attendant advantages of the present invention will be readily appreciated as the same becomes better understood by reference to the following detailed description which considered in conjunction with the accompanying drawings in which like reference numerals designates like parts throughout the figures thereof, and wherein.

DESCRIPTION OF THE PREFERRED EMBODIMENTS

Figure 1:
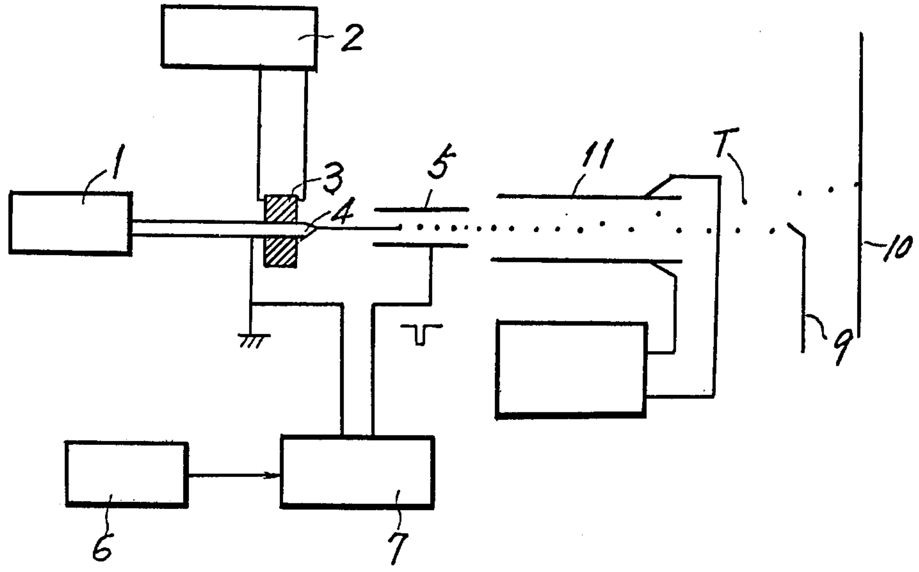
FIG. 1 is a schematic illustration of an ink jet system printer of the charge amplitude controlling type.

Referring now to FIG. 1 there is illustrated a general construction of conventional ink jet system printers including an ink jet system printer embodying the present invention, wherein a string of ink drops T to be deposited on a record receiving medium 10 is formed by the ejection of ink from a ink supply source 1 through a nozzle 4 activated by a vibrator 3 responsive to signals from an ultrasonic signal source 2. The thus formed ink drops have fine quality. In particular, the best results are obtained under the ink pressure of 2.2 Kg/cm$^2$, the nozzle diameter of around 65 $\mu$m and the ultrasonic frequency of 35 KH$_z$.

Figure 2:
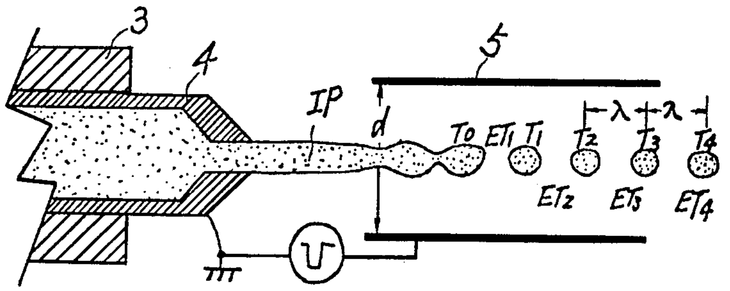
FIG. 2 is a detailed illustration of an ink drop charging state in the printer of FIG. 1.

As will be clear from FIG. 2, the ink liquid ejected through the nozzle 4 is broken up into ink drops within the interior of a charging electrode 5 and subsequently the respective ink drops are charged in accordance with video signals from a video signal generator 7 responsive to signals from an information source. As the ink drops pass through deflection electrodes 11, they are deflected in accordance with the amplitude of their charges to form a desired printing pattern on the medium 10. Undesired ink drops are reverted to the ink supply 1 via a gutter 9.

The important aspect of the present invention resides in the following point. The inventor's attention is directed toward the fact that the specific ink drop $T_o$ being currently charged is influenced under electric fields $E_{T1}$, $E_{T2}$, . . . due to the charges $q_{T1}$, $q_{T2}$, . . . on the preceding ink dorps $T_1$, $T_2$, . . . , which accompanies intensity reduction in the electric field $E_V$ established by the video signal supplied to the charging electrode 5 for the specific ink drop $T_o$. This implies that the specific ink drop $T_o$ is charged under the electric field $E = E_V - E_{T1} - E_{T2} - \ldots = E_v - E_n$. The present invention is to alleviate the error term $E_n = E_{T1} + E_{T2} + \ldots$. Affix of negative sign to $E_{T1}$, $E_{T2}$, . . . in the above equation is due to the fact that the electric field due to the charging electrode is opposite to the counterpart due to the ink drops.

Figure 3:
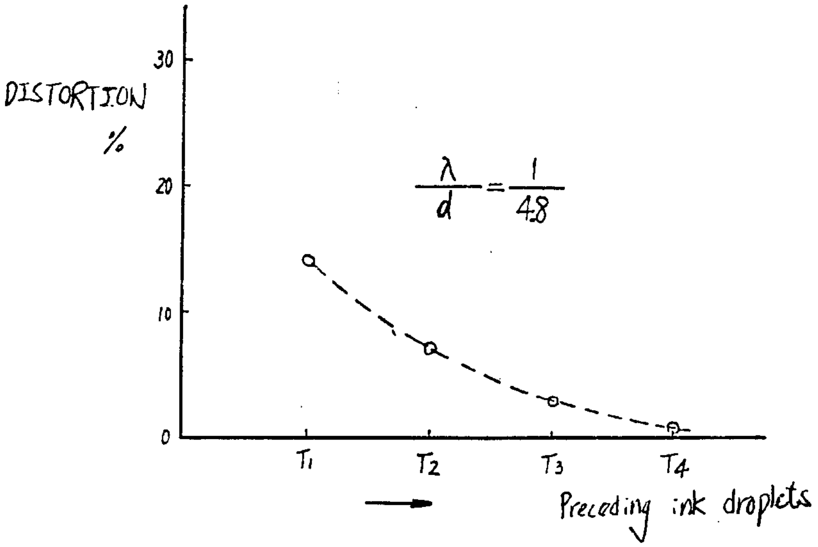
FIG. 3 is a graph showing the relationship between distortion and preceding ink drops.

By way of example, when $\lambda/d \approx 0.2$ wherein $\lambda$ is the ink drop spacing and $d$ is the diameter of the charging electrode 5 the adverse effects on the specific ink drop $T_o$ being formed will be given below, as also suggested in FIG. 3.

Distortion due to the charge amplitude $q_{T1}$ of the ink drop $T_1$ — 14%

Distortion due to the charge amplitude $q_{T2}$ of the ink drop $T_2$ —7%

Distortion due to the charge amplitude $q_{T3}$ of the ink drop $T_3$ — 3%

Distortion due to the charge amplitude $q_{T4}$ of the ink drop $T_4$ — 0.5%

Figure 4:
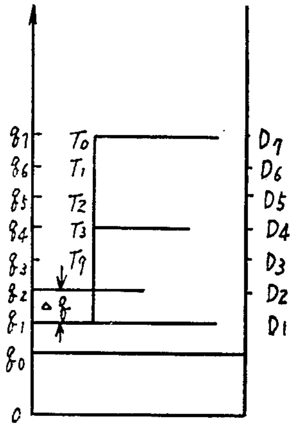
FIG. 4 is a graph showing the relationship the amplitude of charge and character pattern.

It should be noted that the distortion is evaluated under assumption that the contiguous ink drops have the same charge amplitude (for example, the charge amplitude $q_7$ of the ink drop $D_7$ on the seventh row as shown in FIG. 4) for simplicity of explanation through at no time do the respective ink drops assume the same charge amplitude during one-column printing. The ink drop $T_1$ corresponds to the same on the sixth row and shows distortion $e = 14(q_6/q_7)\%$ when its charge amplitude is $q_6$. When the ink drop $T_1$ is in correspondence to that on the fourth row, it shows distortion $e = 14(q_4/q_7)\%$ wherein its charge is designated $q_4$. Meanwhile, when the ink drop $T_3$ corresponds to the same on the sixth row and assumes the charge amplitude $q_6$, distortion is represented by $e = 3(q_6/q_7)\%$.

FIG. 4 illustrates the charge amplitude necessary to print a typical character E. It is obvious that a specific ink drop $D_n$ assumes the charge amplitude as defined below where the charge amplitude of the ink drops $D_1$, $D_2$, . . . on the first line, the second line, — is designated $q_1 q_2$, . . . .

$$q_n = q_o + n\,\Delta q \qquad (1)$$

wherein $q_o$ is the charge on the gutter level, $\Delta q$ is the charge difference among the adjacent ink drops and $n$ is an integer, 1, 2, 3, . . . 7.

Printing distortion occurring during practical operation will be evaluated by reference to FIG. 4 in the case that the ink drop on the first column, the seventh row is desired to be charged.

The ink drop $T_o$ — the first column, the seventh row
The ink drop $T_1$ — the first column, the sixth row
The ink drop $T_2$ — the first column, the fifth row
The ink drop $T_3$ — the first column, the fourth row
The ink drop $T_4$ — the first column, the third row As suggested in FIG. 3, these ink drops will afford the adverse effects on the specific ink drop $T_o$ as follows:

The effect due to the ink drop $T_1$ — $14(q_6/q_7)\%$
The effect due to the ink drop $T_2$ — $7(q_5/q_7)\%$
The effect due to the ink drop $T_3$ — $3(q_4/q_7)\%$
The effect due to the ink drop $T_4$ — $0.5(q_3/q_7)\%$ A total of distortion subject to the specific ink drop $T_o$ can be expressed as follows:

$$e = 0.14(q_6/q_7) + 0.07(q_5/q_7) + 0.03(q_4/q_7) + 0.005(q_3/q_7)$$

This equation can be rewritten when $q_o = \Delta q$.

$$e = 0.14(7q_o/8q_o) + 0.07(6q_o/8q_o) + 0.03(5q_o/8q_o) + 0.005(4q_o/8q_o) \approx 0.20$$

Therefore, the specific ink drop $T_o$ assumes the following charge amplitude when supplied with charging voltage taking account of no influence due to the charges of the preceding ink drops and in other words when supplied with voltage $V_7$ proportional to the charge $q_7$ on the seventh row.

$$q_7 \times (1 - e) \approx 0.8 q_7$$

Therefore, it shows distortion of 20%.

It will be understood from the foregoing formulas that increase in the gutter level provides increase in $(q_6/q_7)$, $(q_5/q_7)$, — and thus increase in distortion.

The results of the inventor's experiments show the existence of the charge amplitude $\Delta q_{T_n}$ due to an electric field $\Delta ET_n$ determined by the charge amplitude $q_{T_n}$ of the preceding ink drops and the geometric relationship between the charging electrode and the ink liquid stream. This is proportional to distortion, and voltage $\Delta V_{T_n}$ to the charging electrode effective to cancel the term $\Delta q_{T_n}$ can be expressed below: $\Delta V_{T_n} = \beta_{T_n} \cdot a_{T_n}$ wherein $\beta_{T_n}$ is the electrode factor.

The above discussed distortion can be overcome by the following operation effected upon the charge amplitude $q_{T_n}$ and the electrode factor $\beta_{T_n}$ as operands.

$$V = V_o + \beta_{T1} \cdot q_{T1} + \beta_{T2} \cdot q_{T2} + \beta_{T3} \cdot q_{T3} + \beta_{T4} \cdot q_{T4}$$
$$V = \beta_{T_n} \cdot q_{T_n} + V_C \qquad (2)$$

Voltage effective to supplied the ink drop $T_o$ with the charge $q_o$ when the preceding ink drops have no charge, is $V_o = \beta_{T_n} \cdot q_{T_n} \cdot \beta_{T_n} \cdot q_{T_n}$ ($n = 1, 2, 3, \ldots$) represents voltage supplied to the charging electrode to compensate for the adverse effect of $q_{T_n}$. The factor $\beta_{T_n}$ is varied by modification in the electrode assembly and, as a matter of fact, is adjustable in circuit implementations.

Figure 5:
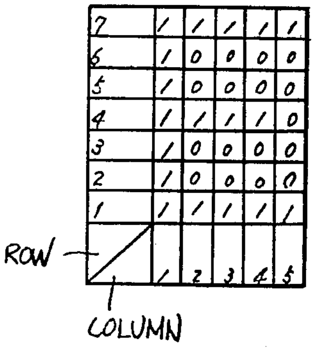
FIG. 5 is a truth table of a character "E;"
Figure 6:
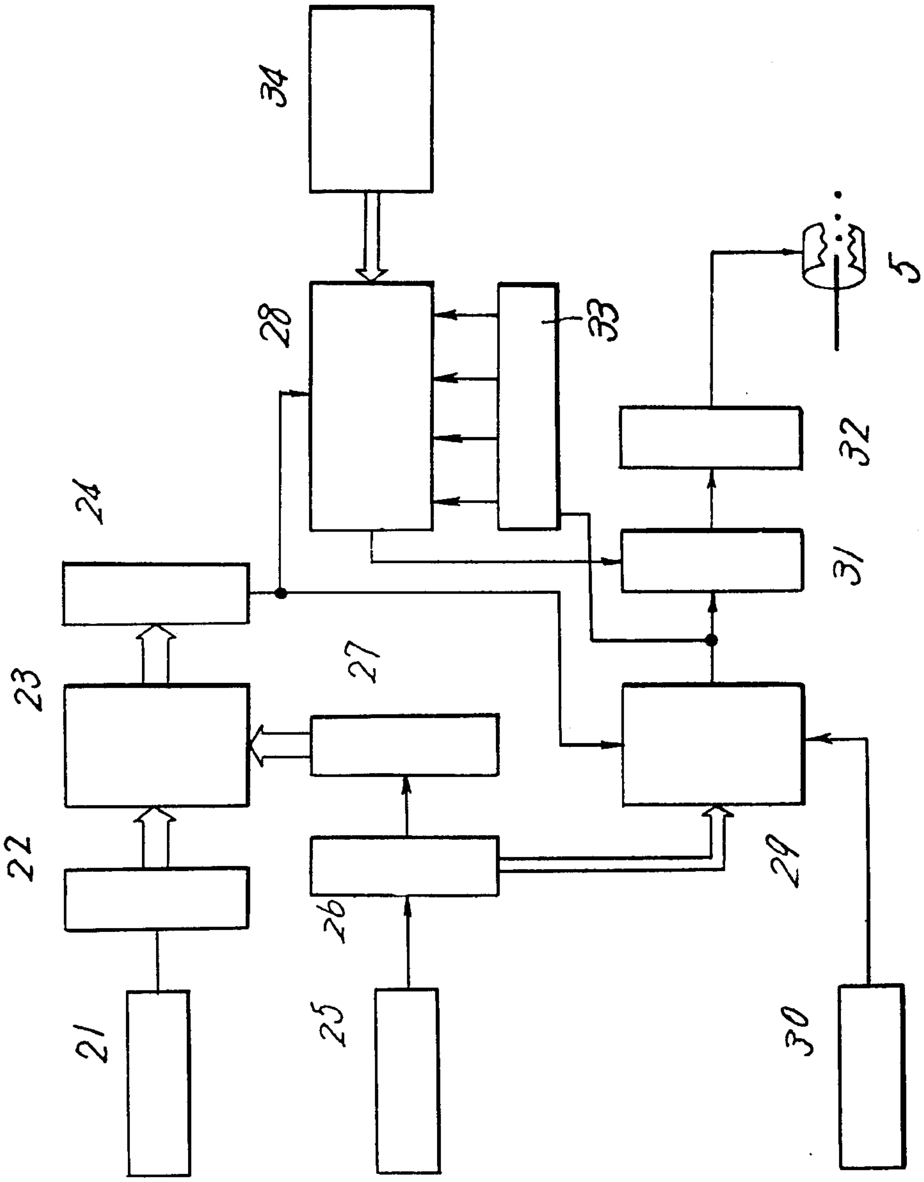
FIG. 6 is a schematic illustration of an ink jet system printer embodying the present invention.
Figure 7:
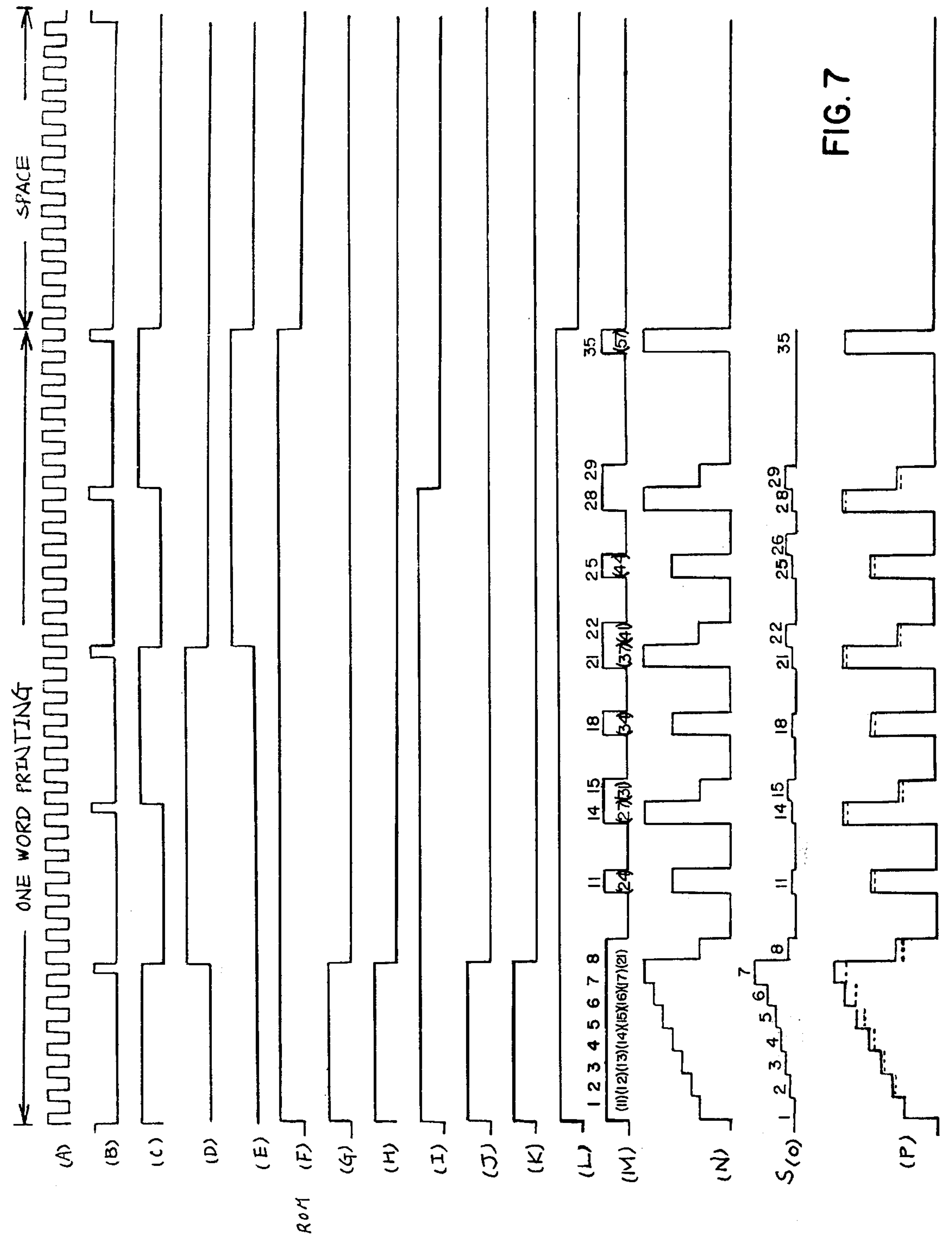
FIG. 7 is a waveform diagram of various signals occurring at the ink jet system printer of FIG. 6.
Figures 8, 9:
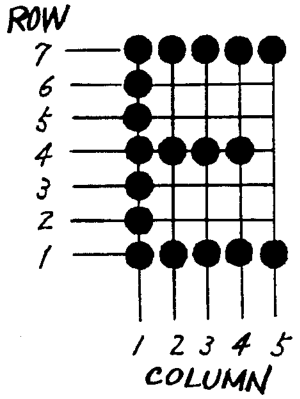
FIG. 8 is an ROM output table for a 5 × 7 matrix in the ink jet system printer of FIG. 6.
FIG. 9 is a pattern normally written out by the ink jet system printer.

FIG. 6 illustrates means for compensating for the charge amplitude in accordance with teachings of the present invention. In this drawing, 21 represents an input/output interface. Digital information entered through the interface enables a read only memory (ROM) 23 via a seven-bit serial-parellel converter 22. The outputs of ROM 23 are shown in FIG. 7 F – L. The truth table for ROM is shown in FIG. 5 where the character "E" is selected.

When the desired character is selected, a × 5 column counter 27 is set concurrently with the setting of a × 7 row counter 26 receiving signals (FIG. 7A) from a timing signal generator 25, and subsequently incremented by the output (FIG. 7B) of the row counter 26 as suggested by FIG. 7C – 7E.

When the first column is selected by the output of the column counter, the results are entered into the converter 24 and then into a compensation factor generator 28 bit by bit in synchronization with the × 7 counter 26 (FIG. 7M). A step waveform generator 29 produces seven-step waveform as shown in FIG. 7N upon receipt of the outputs of the row counter 26 and receives the outputs from an erasing level setting circuit 30. It provides its step waveform output when the output of the converter 24 is 1 (FIG. 7M) and does not provide the same when the output is 0. A compensation signal S (FIG. 70) from the compensation factor generator 28 is added to the thus obtained step waveform output. The result is shown in FIG. 7P and supplied via a video amplifier 32 to the charging electrode. An analog memory 33 provides the compensation signal S in response to the outputs $A_{T1}$, $A_{T2}$, . . . .

Figure 10:
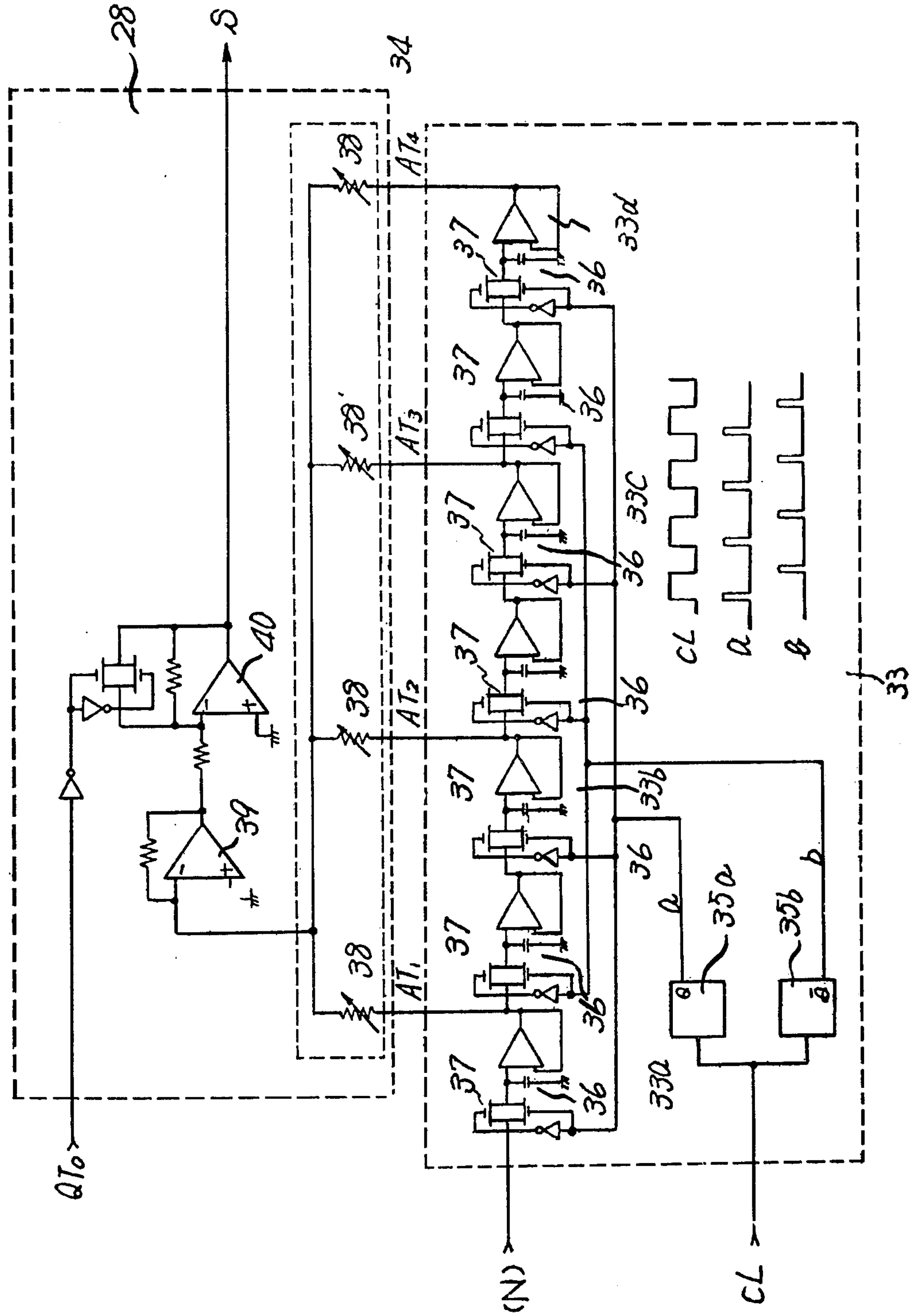
FIG. 10 is a schematic illustration of one preferred form of the present invention including a compensator factor generator, an analog memory and an electrode factor generator.

A circuit arrangement including the compensation factor generator 28, the analog memory 33 and the electrode factor setting circuit 34 is illustrated in FIG. 10, wherein a clock signal CL is supplied to one-shots 35*a* and 35*b* to be changed into a pulse having a pulse width sufficient to charge a voltage holding capacitor 36. The thus changed pulse is then applied to an analog switch 37, which also receives the video signal (step waveform) derived from the step waveform generator 29. The output voltage of the analog switch 37 is shifted form the first memory section 33*a* to the fourth memory section 33*d* within the analog memory 33 and the outputs voltages at the respective stages are oriented toward the electrode factor generator 34 as $A_{T1}$, $A_{T2}$, $A_{T3}$ and $A_{T4}$. These output voltages $A_{T1}$, $A_{T2}$, $A_{T3}$ and $A_{T4}$ are adjusted in accordance with $\beta_{T1}/\beta_T$, $\beta_{T2}/\beta_T$, $\beta_{T3}/\beta_T$ and $\beta_{T4}/\beta_T$ by means of variable resistors 38 and then supplied to an 39. An analog gate circuit 40 is switched between the ON and the OFF states in accordance with the state of the ink drop $T_o$ and more particularly the output of the gate circuit 40 is 0 when the ink drop $T_o$ is 0. Conversely, when the ink drop $T_o$ is 1 the output of the adder 39 is inverted to provide the positive compensation signal.

The compensation factor generator 28 operates in the following manner.

I. when $Q_{T_0} = 0$ and in other words the charging of the ink drop $T_o$ is not requested, the generator 28 provides 0.

II. When $Q_{T_0} = 1$ and the charging is requested, the following operation is effected.

ink drop: $T_0, T_1, T_2, T_3, T_4$;

analog memory output: $A_{T1}, A_{T2}, A_{T3}, A_{T4}$;

electrode factor: $\beta_{T0}\ \beta_{T1}, \beta_{T2}, \beta_{T3}, \beta_{T4}$.

Therefore, since the outputs of the step waveform generator 29 and the analog memory 33 show voltage $A_{T_n} = \alpha . q_{T_n}$ $n = 0.1. \ldots 4$, the compensation signal S is proportional to $V_c$ defined in (2) as follows:

$$S = A_{T1} \cdot \frac{\beta_{T1}}{\beta_{T_o}} + A_{T2} \cdot \frac{\beta_{T2}}{\beta_{T_o}} + A_{T3} \cdot \frac{\beta_{T3}}{\beta_{T_o}} + A_{T4} \cdot \frac{\beta_{T4}}{\beta_{T_o}} \cdots$$

$$= \frac{\alpha}{\beta_{T_o}} (\beta_{T1} \cdot q_{T1} + \beta_{T2} \cdot \beta_{T2} + \beta_{T3} \cdot q_{T3} + \beta_{T4} \cdot q_{T4}) \quad (3)$$

The compensation signal S is provided in this way by the generator 28 and supplied to the input to the adder 31, which performs addition of the compensation signal S and the output of the generator 29 $A_{T_0} = \alpha . q_{T_0}$.

$$\alpha \cdot q_{T_o} + \frac{\alpha}{\beta_{T_o}} (\beta_{T1} \cdot q_{T1} + \beta_{T2} \cdot q_{T2} + \beta_{T3} \cdot q_{T3} + \beta_{T4} \cdot q_{T4})$$

$$= \frac{\alpha}{\beta_{T_o}} (\beta_{T_o} \cdot q_{T_o} + \beta_{T_1} \cdot q_{T_1} + \ldots)$$

The video amplifier 32 produces the video signal V by multiplication of $\beta_{T0}/\alpha$, $$V = \beta_{T_o} \cdot q_{T_o} + \beta_{T1} + Q_{T1} + \ldots$$

Figure 11:
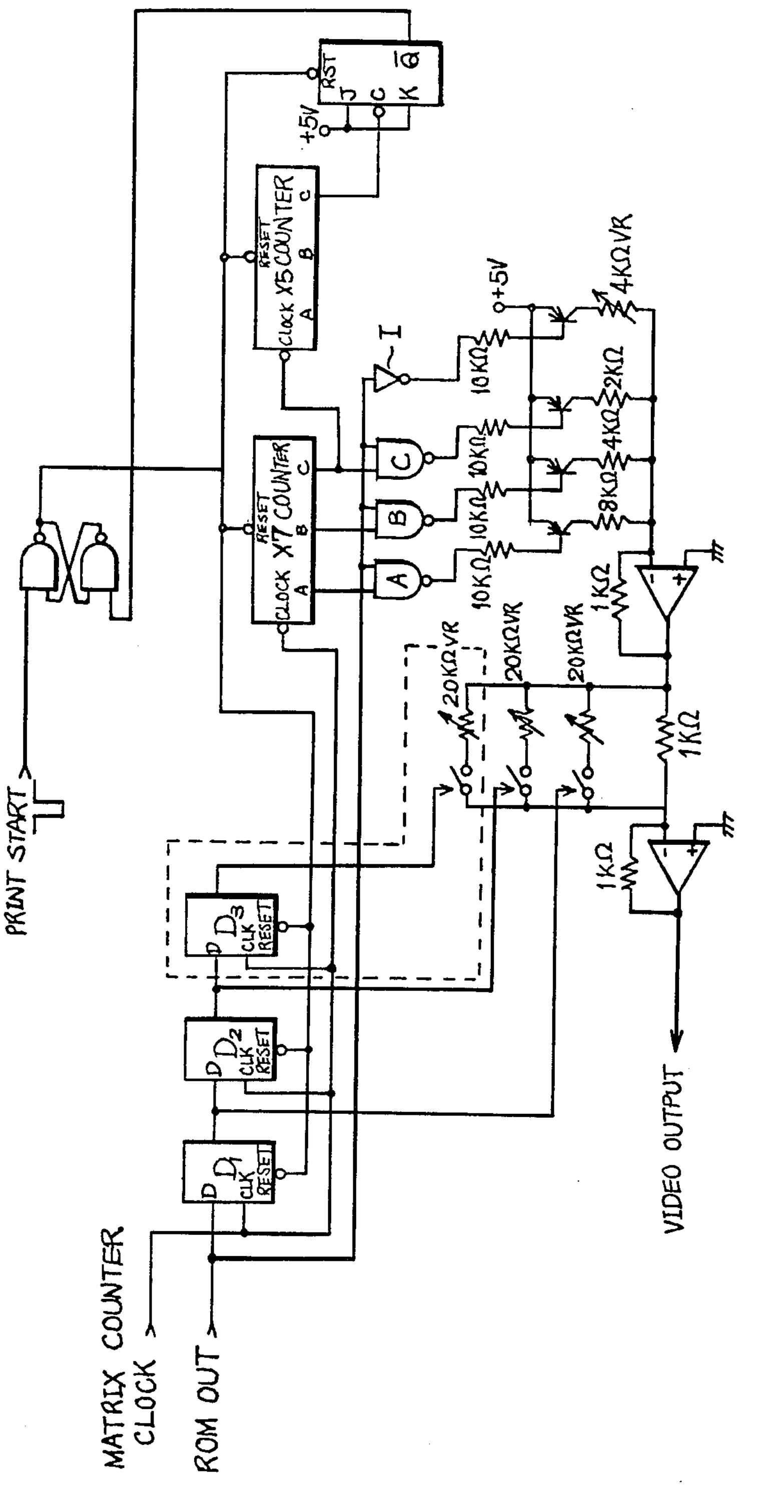
FIG. 11 is a schematic illustration of another preferred form of the present invention.
Figure 12:
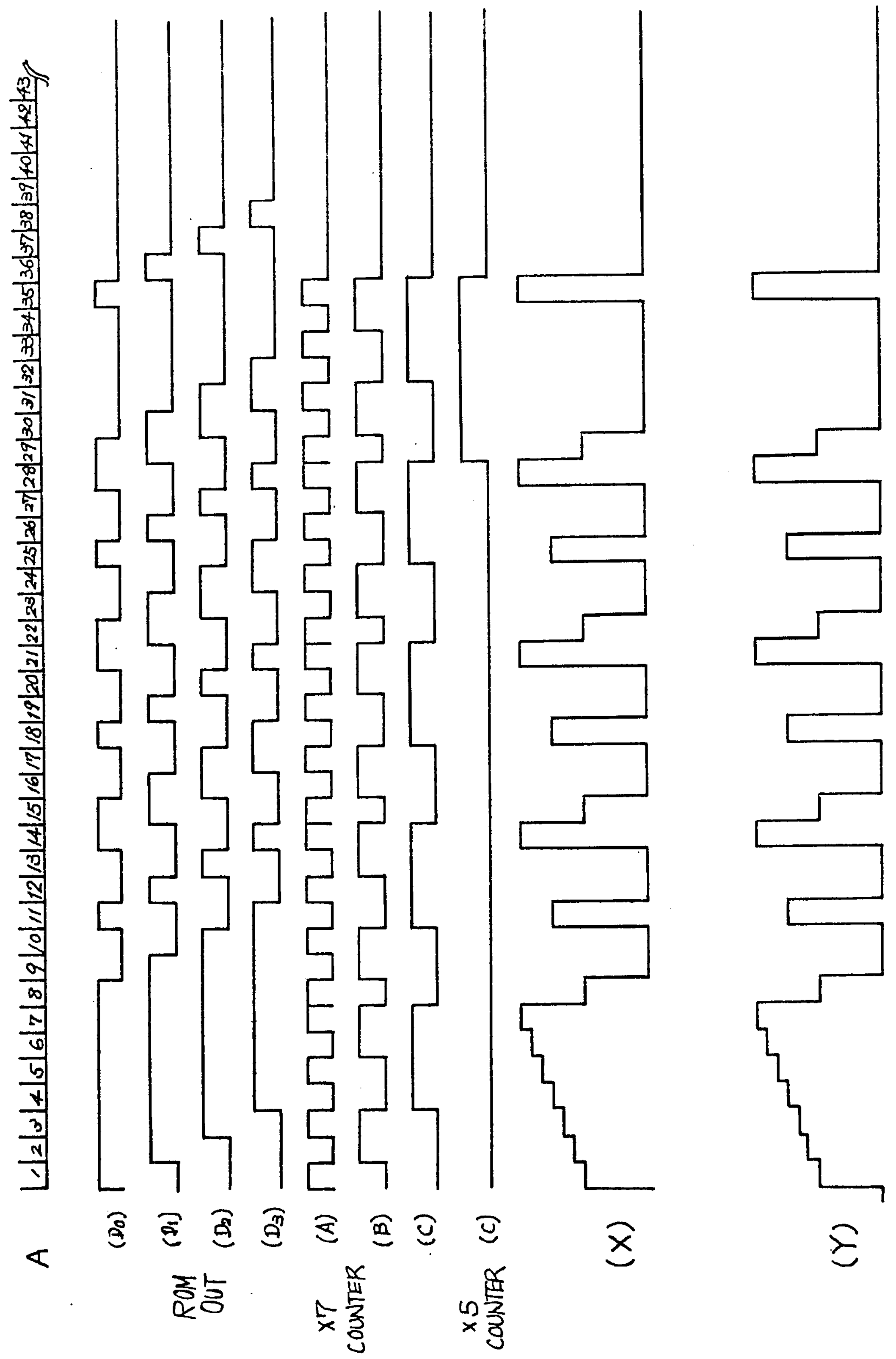
FIG. 12 is a waveform diagram of various signals occurring in the preferred form of FIG. 11.

FIG. 11 illustrates another method for compensation, while FIG. 12 illustrates waveforms for the purpose of explanation of operation.

The signal $D_o$ from ROM is sent to an ink drop state storage consisting of three stage cascaded delay flip flops to form signals $D_1$, $D_2$ and $D_3$ in accordance with the output A from a timing generator. The outputs of a × 7 counter 7C incremented by the trailing edge of the timing generator output are shown in FIG. 12 by 7C (A), 7C (B) and 7C (C). An inverter I responsive to the signal $D_o$ is placed into the 0 state when $D_o = 0$ and the ink drop corresponding to $D_o$ is used for printing purposes. This renders a transistor TrG conductive to permit the flowing of current determined by $VR_o$.

A circuit including I, TrG and $VR_o$ is to determine an erasing level of which the amplitude is adustable by $VR_o$, NAND gates A, B, C render the transistors TrA, TrB, TrC "ON" to supply current of weights 1, 2 and 4 through an operation amplifer E.

When $\overline{D_o . A} = 0$ the weight is 1

When $\overline{D_o . B} = 0$ the weight is 2

When $\overline{D_o . C} = 0$ the weight is 4

When $\overline{D_o} = 0$, the erasing level

In the given example, the pre-compensated video signal is shown by (X). Subsequently, the gain control serves to vary its gain by means of the analog switch responsive to $D_1$, $D_2$, $D_3$.

While only certain embodiments of the present invention have been described, it will be apparent to those skilled in the art that various changes and modifications may be made therein without departing from the spirit and scope of the invention as claimed.

1. In an ink jet system printer of the charge amplitude controlling type for recording characters in a dot matrix pattern by a sequence of charged ink drops, means compensating for the effects of charges on previous ink drops in a sequence on the current charged drops, comprising:

a read only memory (ROM) storing digital character generation output formats;

means controlling said ROM to output a selected character format;

a character generator responsive to said digital character format output from said ROM to produce a step waveform character signal;

dot matrix determining means controlling said character generator to correlate said step waveform character signal to said dot matrix pattern;

storage means receiving said step waveform character pattern and retaining a predetermined significant number of preceding steps from said waveform for each given current step therein;

proportioning means transmitting selectively attenuated magnitudes of said significant steps from said storage means;

an adder receiving and summing said attenuated magnitudes to provide a correction signal for a current step in said waveform as a function of said significant number of preceding steps; and means synchronously adding said correction signal to its corresponding step in said stepped character signal to provide a stepped character output signal compensated for the effects of a predetermined significant number of preceding ink drops for each charged ink drop generated.

2. The invention defined in claim 1, wherein said compensating means further includes:

gate means receiving and selectively transmitting the correction signal from said adder to said synchronous adding means;

said gate means being responsive to the presence and absence of a charging signal for a current drop in said sequence to enable and preclude, respectively, the transmission of a correction signal for the said current drop.

* * * * *